United States Patent
Oomens (10) Patent No.: US 12,419,322 B2
(45) Date of Patent: Sep. 23, 2025

(54) MULTI-TEXTURE CONFECTION

(71) Applicant: FERRARA CANDY COMPANY, Chicago, IL (US)

(72) Inventor: Sean Oomens, Huntley, IL (US)

(73) Assignee: FERRARA CANDY COMPANY, Chicago, IL (US)

( * ) Notice: Subject to any disclaimer, the term of this patent is extended or adjusted under 35 U.S.C. 154(b) by 0 days.

(21) Appl. No.: 17/389,050

(22) Filed: Jul. 29, 2021

(65) Prior Publication Data

US 2022/0030905 A1 Feb. 3, 2022

Related U.S. Application Data (60) Provisional application No. 63/059,591, filed on Jul. 31, 2020.

(51) Int. Cl.
*A23G 3/54* (2006.01)

(52) U.S. Cl.
CPC ...................... *A23G 3/54* (2013.01)

(58) Field of Classification Search
CPC ........................................ A23G 3/54
See application file for complete search history.

(56) References Cited

U.S. PATENT DOCUMENTS

| | | | |
|---|---|---|---|
| 5,532,004 A | 7/1996 | Bell et al. | |
| 5,545,417 A | 8/1996 | Richey et al. | |
| 6,238,690 B1 | 5/2001 | Kiefer et al. | |
| 6,303,159 B2 | 10/2001 | Barkalow et al. | |
| 6,375,981 B1 | 4/2002 | Gilleland et al. | |
| 6,403,140 B1 | 6/2002 | Tiainen et al. | |
| 6,528,088 B1 | 3/2003 | Gilleland et al. | |
| 6,623,784 B2 | 9/2003 | Zerby et al. | |
| 6,723,358 B1 | 4/2004 | van Lengerich | |
| 6,790,453 B2 | 9/2004 | Porzio et al. | |
| 6,887,493 B2 | 5/2005 | Shefer et al. | |
| 7,147,885 B2 | 12/2006 | Asano et al. | |
| 9,126,198 B2 | 9/2015 | Yoshikawa et al. | |
| 2009/0130269 A1* | 5/2009 | McCausland | A23G 3/26 426/295 |

(Continued)

FOREIGN PATENT DOCUMENTS

| | | |
|---|---|---|
| EP | 561735 B1 | 10/1996 |
| EP | 702520 B1 | 4/1997 |

(Continued)

OTHER PUBLICATIONS

PCT, International Search Report, mailed Nov. 16, 2021, 9 pages.

(Continued)

*Primary Examiner* — Stephanie A Kohler
(74) *Attorney, Agent, or Firm* — Foley & Lardner LLP (57) ABSTRACT

The present invention is directed to non-chewing gum confections and in particular to a confection having at least two textures (dual-textured confectionery). A dual-textured confectionery having a chewy center and a crunchy coating is disclosed. The chewy center may be a gummy candy and the crunchy coating may be a discontinuous coating that comprises small irregular pieces of candy. A method for making the dual-textured confectionery is also disclosed.

18 Claims, 7 Drawing Sheets
(4 of 7 Drawing Sheet(s) Filed in Color)

(56) References Cited

U.S. PATENT DOCUMENTS

| | | | | |
|---|---|---|---|---|
| 2012/0015071 | A1* | 1/2012 | Ortega | A23G 3/343 |
| | | | | 426/5 |
| 2014/0120208 | A1* | 5/2014 | Mateus | A23P 20/25 |
| | | | | 426/94 |
| 2019/0373912 | A1* | 12/2019 | Plociak | A23G 4/10 |

FOREIGN PATENT DOCUMENTS

| | | | |
|---|---|---|---|
| EP | 790777 | B1 | 8/1999 |
| EP | 777422 | B1 | 1/2001 |
| EP | 1075193 | B1 | 8/2004 |
| EP | 1124442 | B1 | 11/2005 |
| EP | 1076067 | B1 | 6/2006 |
| EP | 1023841 | B1 | 8/2006 |
| EP | 1565065 | B1 | 9/2006 |
| EP | 1713349 | B9 | 10/2006 |
| EP | 1524915 | B1 | 3/2007 |
| EP | 1645196 | B1 | 4/2008 |
| EP | 1505078 | B1 | 4/2009 |
| EP | 1804591 | B1 | 8/2010 |
| EP | 1447082 | B1 | 11/2010 |
| EP | 1945041 | B1 | 1/2011 |
| EP | 1539114 | B1 | 2/2011 |
| EP | 1260218 | B1 | 7/2011 |
| EP | 2168439 | B1 | 9/2011 |
| EP | 2249658 | B1 | 9/2011 |
| EP | 1830802 | B1 | 7/2012 |
| EP | 1699298 | B1 | 9/2012 |
| EP | 2003983 | B1 | 1/2013 |
| EP | 2364599 | B1 | 8/2014 |
| EP | 2241579 | B1 | 12/2014 |
| EP | 2675292 | B1 | 7/2015 |
| EP | 2773225 | B1 | 11/2016 |
| EP | 2666368 | B1 | 2/2017 |
| EP | 2967109 | B1 | 5/2017 |
| EP | 2117336 | B1 | 8/2017 |
| EP | 2945492 | B1 | 6/2018 |
| EP | 2515669 | B1 | 8/2018 |
| EP | 2779837 | B1 | 4/2019 |
| EP | 2724623 | B1 | 5/2019 |
| EP | 1845799 | B2 | 7/2019 |
| EP | 2919589 | B1 | 10/2019 |

OTHER PUBLICATIONS

International Preliminary Report on Patentability, PCT/US2021/043824, dated Feb. 9, 2023, 8 pages.
European Supplemental Search Report, Application No. 21849043.1, dated Jun. 4, 2024, 10 pages.
Mintel, Fruit Flavoured Gummies, XP093160683, Database accession No. 7510057, dated Apr. 7, 2020, 2 pages.
Ferrara, Fun and Innovative Nerds Candy Debuts First-of-its-Kind Treat: Nerds Gummy Clusters, URL:https://www.prnewswire.com/news-releases/fun-and-innovative-nerds-candy-debuts-first-of-its-kind-treat-nerds-gummy-clusters-301097488.html, dated Jul. 22, 2020, 3 pages.
Anonymous, The New Nerds Gummy Clusters Combine Crunchy and Gummy Bites, So Check the Candy Aisle, URL:https://www.bestproducts.com/lifestyle/a32770176/ferrara-candy-company-nerds-gummy-clusters, dated Jul. 16, 2020, 6 pages.
Good Eats 420, The Easiest Way to Make Nerd Ropes, GoodEats420.com, URL:https://www.youtube.com/watch?v=DoRyjd2zKwy, dated Jul. 24, 2020, 2 pages.
Jake Tuckner, Nerds on Food Networks Unwrapped, URL:https://www.youtube.com/watch?v=zHjFXeUbVEM, dated Apr. 3, 2013, 2 pages.
Wayup Goodies & NUBIA420, We Made Canna Nerd Hearts with Store Gummies & Tincture, URL:https://www.youtube.com/watch?v=IZ5AS2mBK-w, dated Mar. 23, 2020, 2 pages.

* cited by examiner

MULTI-TEXTURE CONFECTION

CROSS-REFERENCE TO RELATED APPLICATIONS

This application claims the benefit of U.S. Provisional Application No. 63/059,591, filed Jul. 31, 2020. The entirety of the above referenced application is hereby incorporated by reference.

TECHNICAL FIELD

The present invention is directed to non-chewing gum confections and, in particular, to a confection having at least two textures (dual-textured confectionery).

BACKGROUND

Gelled "gummy" confectionery products are widely known chewy candy with a springy, resilient character with varying degrees of firmness. These confectionery products are often made with gelatin or gelatin alternatives, corn syrup and/or sugar and starches. Such candies may include a "sour sanding" coating to achieve both a sweet and tart taste sensation. Other candies have a crunchy candy shell that envelops the chewy center.

Trolli® candies include sweet and sour gummy candies in various shapes including various animals, hands, stars, and other shapes. Trolli® gummi candies are configured as monolithic elements. In some candies, a portion of each Trolli® gummi candy piece may have a first color and a first flavor, while a second portion may have a second color and a second flavor.

NERDS® candies are small crunchy sugar-based candies with an irregular pebble shape. Commercially available NERDS® candy pebbles are usually about 0.2-1 mm in size.

Although some of these confections provide flavor combinations or specialty textures, further improvements in texture and flavor combinations are possible. A need exists for non-chewing gum confections that have multiple textures to enhance enjoyment. A need also exists for a dual-textured non-chewing gum confection that has a greater amount of crunchiness. Such a confection should also provide a variety of different colors and/or flavors to achieve further permutations in appearance and different flavor combinations. The present invention addresses these as well as other challenges related to dual texture confections.

BRIEF SUMMARY

The present disclosure is directed to a multi-textured confection having at least two textures. In some aspects, the disclosure is directed to a dual-textured non-chewing gum confectionery product having two components, where the two components have different textures: chewy and crunchy. This dual-textured confectionery comprises a chewy center and a crunchy coating.

Chewy includes, but is not limited to, a confectionery or candy having a consistency requiring chewing and may be somewhat firm and sticky. The chewy component can be gummies, gummy candies, jelly candies, gelatin-based chewable sweets, or pectin-based chewable sweets. Crunchy includes, but is not limited to, a confectionery or candy having a hard texture and is not soft or mushy. The crunchy component can be candy pebbles of a variety of sizes and shapes.

In some aspects, the chewy component is generally made of "gummy" type elements. The gummy composition may be similar to the composition of Trolli® candies, but other gummy compositions such as in fruit snacks or Black Forest® gummies are also foreseen. The different components of the confectionery may also be fruit-flavored elements. The chewy component is generally ovoid, spherical, or bean shaped and does not comprise a chewing gum base.

In some aspects, the crunchy component is generally made of a crunchy candy that is attached to the outside of the chewy center to form a discontinuous coating or layer. In some aspects, the crunchy component is made of small pieces that are irregularly shaped, such as a candy pebble. This crunchy component may be crystallized sugar that itself has a hard coating. In some aspects, the crunchy component may be similar to the candy pebble composition of NERDS® candies. In other aspects, the crunchy component may be similar to the composition of NERDS® candies (candy pebble) but in a smaller size. In further aspects, the crunchy component may be irregular broken bits of various types of candy.

In some aspects, the dual-textured non-chewing gum confectionery is bite-sized, which is no more than about 1 inch in any dimension.

The crunchy component comprises at least 40% by weight of the confectionery. In some aspects, the crunchy component and the chewy component may be generally present in equal amounts (by weight) in the dual-textured non-chewing gum confectionery. However, ratios may range from about 60:40; to about 50:50; to about 40:60 of crunchy component to chewy component by weight. These ratios of the crunchy component to the chewy component result in a dual-textured non-chewing gum confectionery that has significant crunch. Such dual-textured non-chewing gum confectioneries are much crunchier than those having a continuous candy shell and have the added enjoyment of the irregular crunchy texture. In some embodiments, the crunchy component comprises from about 40% to about 70% by weight of the confectionery.

The different components of the dual-textured non-chewing gum confectionery may each be a different color and/or flavor. In some aspects, these are fruit-flavored elements. For example, green candy elements may be lime or sour apple, red elements may be cherry or strawberry, blue elements may be raspberry, orange elements may be orange, purple elements may be grape, yellow elements may be lemon, etc. The multiple flavors allow for mixing and matching the crunchy coating and chewy center to achieve a large number of different permutations of flavor combinations. Also, many different fruit-flavored elements can be used simultaneously, producing a confection that is not only dual-textured, but also has multiple flavors incorporated therein.

These features are pointed out with particularity in the claims annexed hereto and forming a part hereof. These and other advantages, aspects, and novel features of the present disclosure, as well as details of an illustrated embodiment thereof, will be more fully understood from the following description and drawings.

BRIEF DESCRIPTION OF THE DRAWINGS

The patent or application file contains at least one drawing executed in color. Copies of this patent or patent application publication with color drawings will be provided by the Office upon request and payment of the necessary fee.

Referring now to the drawings wherein like reference numerals and letters indicate corresponding structure throughout the several views:

FIGS. 6A-6C are further black and white views of a dual-textured confectionery, in accordance with an example embodiment of the disclosure.

DETAILED DESCRIPTION

Unless otherwise defined, all technical terms used herein have the same meaning as commonly understood by one of ordinary skill in the art to which the compositions described herein belong. The singular form "a", "an" and "the" include plural referents unless the context clearly dictates otherwise. These articles refer to one or to more than one (i.e., to at least one).

The term "about" as used in connection with a numerical value throughout the specification, and the claims denotes an interval of accuracy, familiar and acceptable to a person skilled in the art. In general, such interval of accuracy is +/−10%.

Where ranges are given, endpoints are included. Furthermore, unless otherwise indicated or otherwise evident from the context and understanding of one of ordinary skill in the art, values that are expressed as ranges can assume any specific value or subrange within the stated ranges in different embodiments of the disclosure, to the tenth of the unit of the lower limit of the range, unless the context clearly dictates otherwise.

Figure 1:
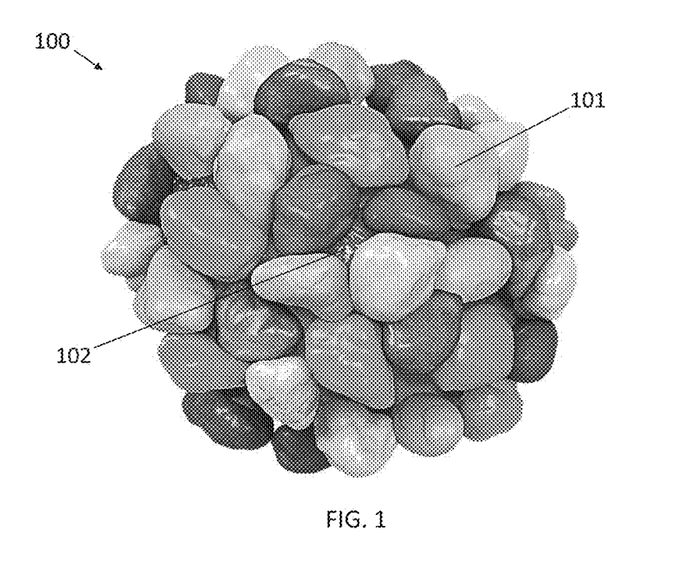
FIG. 1 is a black and white view of a dual-textured confectionery, in accordance with an example embodiment of the disclosure.

Referring now to FIG. 1, there is shown a bite-sized confectionery product 100 that is multi-textured. In some embodiments, the confectionery is dual-textured and has a crunchy component 101 and a chewy component 102.

The chewy component 102 is generally made of "gummy" type elements and does not comprise a chewing gum base. In one embodiment, the chewy component may be a gummy made from gelatin, sodium citrate, and starch, with further added water, sugar, and corn syrup. Flavor and/or color may be added during processing. Starches include, but are not limited to, amylose starches and amylopectin starches from sources such as wheat, corn, potato, or tapioca. In some aspects, modified starches can be used, such as hydrolyzed and acid-modified.

Figure 2:
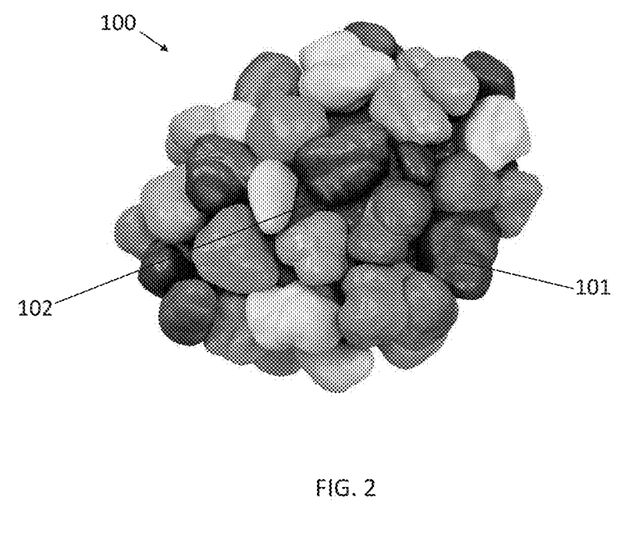
FIG. 2 is a color view of a dual-textured confectionery, in accordance with an example embodiment of the disclosure.
Figure 3:
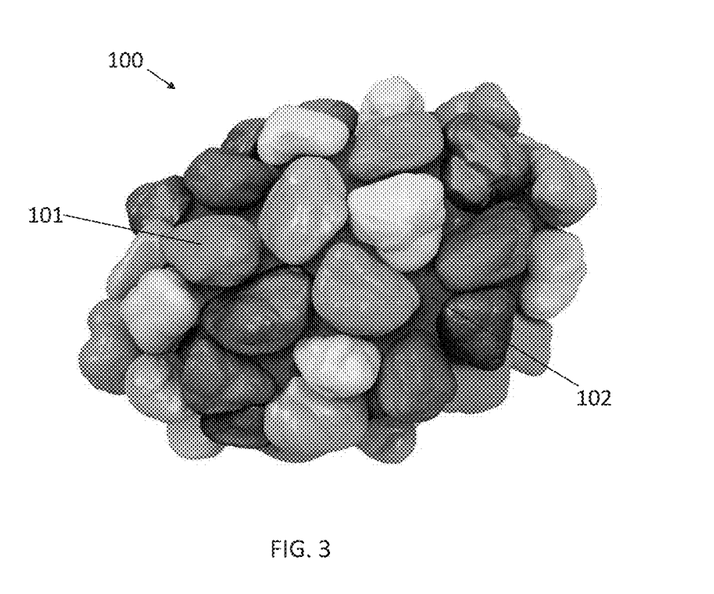
FIG. 3 is a color view of a dual-textured confectionery, in accordance with an example embodiment of the disclosure.
Figure 4:
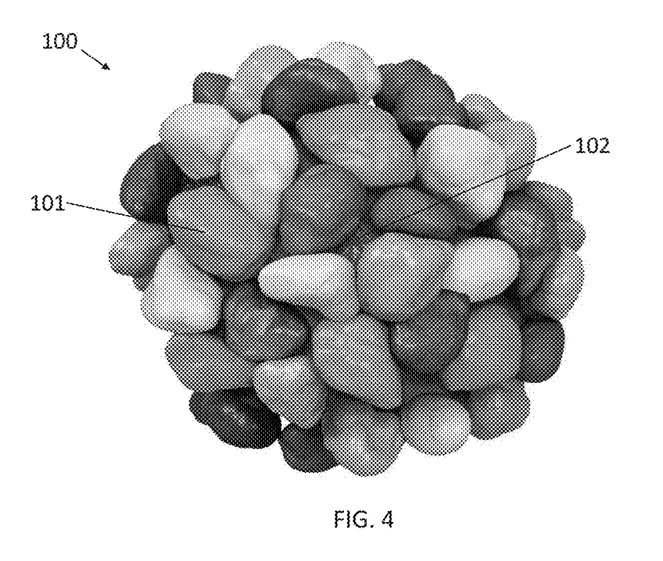
FIG. 4 is a color view of a dual-textured confectionery, in accordance with an example embodiment of the disclosure.

The chewy component 102 is generally ovoid, spherical, or bean shaped, although other shapes are contemplated. The shape of the chewy component on the interior of the confectionery generally determines the shape of the confectionery product 100. In some embodiments, the candy is bite-sized, as in FIG. 1. Further examples of bite-sized confectionery products 100 having different shapes of chewy component centers 102 are illustrated in FIGS. 2-4. In further embodiments, other shapes for the chewy component 102 can be used, such as rings or cylinders. In additional embodiments, shapes for the chewy component 102 may include figures or forms such as gummy bears, gummy worms, and the like.

The crunchy component 101 is generally made of individual small pieces of crunchy candy that have irregular shapes and are attached to the outside of the chewy center (chewy component 102). In some embodiments, the crunchy component 101 may be crystallized sugar that has a hard coating, which has a similar composition to NERDS® candies (candy pebbles).

The crunchy component 101 is adhered to the outside of the chewy center to form a discontinuous coating. The discontinuous coating is not a candy shell, but instead is a coating that comprises asymmetrical, non-uniform, uneven pieces adhered in a layer to the outer surface of the chewy component 102. The irregular and discontinuous nature of the crunchy coating created with the crunchy component 101 provides variety to the coating and increases the overall crunchiness of the resulting confectionery creating a surprisingly crunchy confectionery that also maintains the chewiness at the center.

In one embodiment, the crunchy component 101 comprises at least about 20% by weight of the confectionery; in other embodiments, the crunchy component comprises at least about 25%; at least about 30%; or at least about 35% by weight of the confectionery. In a further embodiment, the crunchy component comprises at least about 40% by weight of the confectionery. However, to maintain full coverage of the chewy component 102 while allowing for a maximized dual-texture, the amount of crunchy component should not exceed about 70% by weight. Thus the crunchy component comprises from about 40% to about 70% by weight of the confectionery.

In embodiments where the crunchy component comprises at least about 40% by weight of the confectionery, the ratio of the crunchy component to the chewy component is at least about a 40:60 ratio. In some aspects, the crunchy component and the chewy component may be generally present in equal amounts (by weight) in the dual-textured confectionery product 100. However, ratios may range from about 60:40; to about 50:50; to about 40:60 of crunchy component to chewy component by weight. In some embodiments, the ratio of the crunchy component to the chewy component may be close to about a 50:50 ratio but slightly skewed in favor of one or the other component, e.g., about 45:55 ratio or about 55:45 ratio. A slightly larger chewy component may be preferred, such as in certain embodiments where the ratio of the crunchy component to the chewy component may be about 45:55 by weight.

Figure 5:
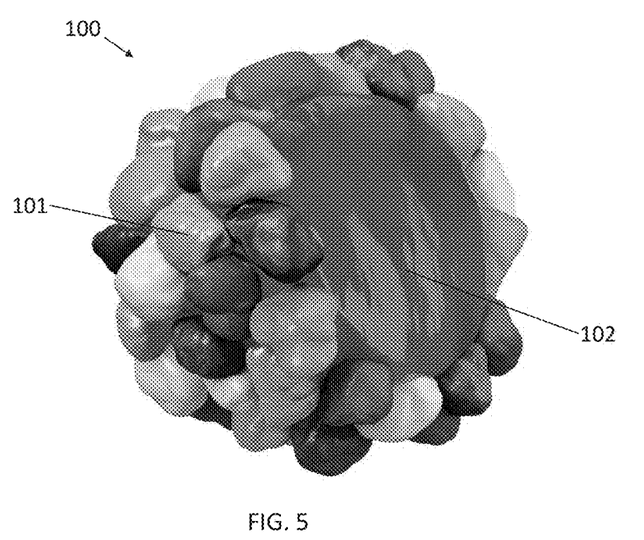
FIG. 5 is a color cross-sectional view of a dual-textured confectionery, in accordance with an example embodiment of the disclosure.
Figure 6A:
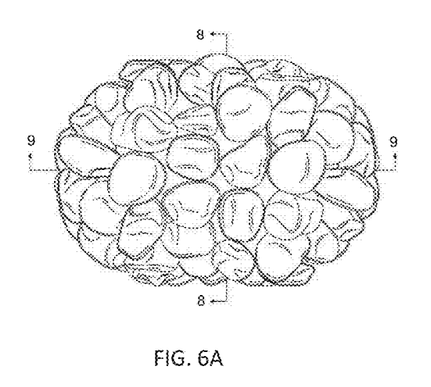
FIG. 6A shows a top plan view of a confectionery piece, with section lines 8 and 9.
Figure 6B:
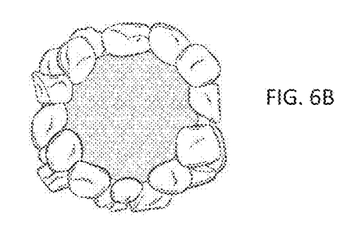
FIG. 6B shows a cross-sectional view taken along the line 8-8.
Figure 6C:
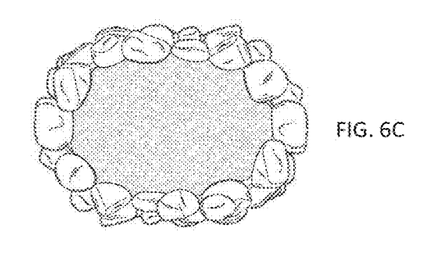
FIG. 6C shows a cross-sectional view taken along the line 9-9.

Referring now to FIG. 5, there is shown a particular example of a bite-sized confectionery product 100 in cross-section so that the gummy center is clearly depicted. In this embodiment, the crunchy component 101 (e.g., candy pebbles on the outside) and the chewy component 102 are generally present in equal amounts by weight, or substantially close thereto (about 50:50 ratio, about 45:55 ratio, or about 55:45 ratio).

The main ingredients in the candy pebbles are various types of sugar and malic acid. The candy pebbles may also contain food syrup, flavors, a coating or glazing ingredient, and artificial coloring. The coloring varies by flavor. Sugars used include, but are not limited to, one or more of sucrose, dextrose, and/or glucose. Food syrups used include, but are not limited to, glucose syrup, corn syrup, maple syrup, and/or high fructose corn syrup. Coating or glazing ingredients used include, but are not limited to, carnauba wax, candelilla wax, beeswax, other food safe waxes, and/or vegetable oils.

Each crunchy component (candy pebble) 101 has a nucleus that is composed of one or more sugar (e.g., sucrose, glucose, etc.) crystals. In some embodiments, the sugar crystal nucleus size may be about 0.2 mm-about 1 mm. Candy pebbles are usually made by panning. The panning process takes the sugar crystal nucleus and tumbles it to create successive layers, which may be sour and/or sweet. In sour embodiments, the candy pebbles may contain agents such as malic acid to provide tartness. Color and flavor may be added in separate steps. In some embodiments, a material such as a gum is added near the end of the process to increase crunchiness and provide a barrier to moisture. At the end of the manufacturing process, the candy pebbles are glazed with, for example, carnauba wax, which gives them further crunch and a glossy finish.

In the present disclosure, the use of candy pebbles as a crunchy component that coats a chewy center is described. To use candy pebbles as a coating on a chewy component center, it is preferable to make them in a small size, such as less than about 5 mm, alternatively less than about 4 mm, alternatively less than about 3.5 mm, alternatively less than about 3 mm, alternatively less than about 2.5 mm, alternatively less than about 2 mm, alternatively less than about 1.5 mm. The smaller size allows for more coating density of the irregularly shaped pieces on the chewy center and thus produces a highly crunchy irregular texture. The candy pebbles are thus much smaller than the chewy center and form a discontinuous coating on the chewy center.

In some embodiments, the sugar crystal nucleus size of the candy pebbles is about 0.4 mm-about 0.85 mm. Further, the sugar crystals help define the irregular shape of the candy pebble.

Moreover, in some embodiments, additives are used to decrease moisture migration of the candy pebble so that it remains crunchy even when attached to the chewy center. These are referred to as moisture barriers. Additives include, but are not limited to, gum arabic, xanthan gum, guar gum, locust bean gum, gum tragacanth, carrageenan, or other food safe gums.

The size of the crunchy component 101 provides good coverage of the chewy component 102, while remaining a discontinuous coating made from individual pieces (e.g. individual candy pebbles). The discontinuous coating covers the chewy component in a substantially single layer, which covers the surface of the chewy component (e.g. gummy center). In some aspects, the crunchy component is of a smaller size than conventional compositions; for example, crunchy component is of a similar composition to the candy pebble composition of NERDS® candies (candy pebble) but in a smaller size. This smaller size crunchy component provides an enhanced dual texture which has increased crunchiness because utilizing a crunchy component of a smaller size surprisingly allows for extra crunchiness over larger pieces. In some embodiments, the crunchy component 101 is no larger than about 0.1 inch in any dimension.

In some aspects, the sugar used to make the smaller size crunchy component is of a smaller granulation size than conventional compositions (e.g. Con AA sugar used for the smaller size as opposed to Con A). In additional aspects, the moisture barrier used for the smaller size crunchy component also promotes increased crunchiness. While conventional compositions use materials such as alcohol based shellac as a moisture barrier, the disclosed crunchy component is formulated utilizing a water based gum as a moisture barrier. In some embodiments, a water based gum arabic solution may be used.

To assure that the candy pebble is of the right size range for inclusion in the dual-textured candy, it may be sieved for size. In some embodiments, a 0.375 inch (ca. 9.53 mm) screen may be used for the upper cutoff. In other embodiments, a 6 mesh sieve (0.132 inch) may be used as the cutoff. In other embodiments, a 10 mesh sieve (0.0787 inch) may be used as the cutoff. In one embodiment, the candy pebbles used for the crunchy component are those that pass through all of a 0.375 inch screen, a 6 mesh sieve (0.132 inch; ca. 3.35 mm) and a 10 mesh sieve (0.0787 inch; ca. 2 mm), meaning that the crunchy component 101 as depicted in FIGS. 1-5 is no larger than about 0.0787 inches in any dimension.

In other aspects, even smaller sizes are contemplated such as where an 18 mesh sieve (1 mm; 0.0394 inch) may be used as the cutoff for the size of the crunchy component. In a further embodiment, the candy pebbles used for the crunchy component are those that pass through all of a 0.375 inch screen, a 6 mesh sieve (0.132 inch; ca. 3.35 mm), a 10 mesh sieve (0.0787 inch; ca. 2 mm) and an 18 mesh sieve (1 mm; 0.0394 inch), meaning that the crunchy component 101 as depicted in FIGS. 1-5 is no larger than about 0.0394 inches in any dimension.

In some aspects, the candy pebble is of the right size range for inclusion in the dual-textured candy when it passes through at least an 8 mesh sieve (2.36 mm; 0.093 inch); alternatively through at least a 10 mesh sieve (2 mm; 0.079 inch); alternatively through at least a 12 mesh sieve (1.7 mm; 0.0661 inch); alternatively through at least a 14 mesh sieve (1.4 mm; 0.0555 inch); alternatively through at least a 16 mesh sieve (1.18 mm; 0.0469 inch); or alternatively through at least an 18 mesh sieve (1 mm; 0.0394 inch).

In the dual-textured confectionery product 100, the crunchy component 101 and the chewy component 102 of the confectionery may each be a different color and/or flavor. In some embodiments, the crunchy component and the chewy component may be the same flavor. In some embodiments, the crunchy component and the chewy component may be of different flavors. In some embodiments, each flavor is a unique color. In another embodiment, the chewy component has a single flavor, and the crunchy component may have a variety of flavors. In a preferred embodiment, the crunchy component has a variety of flavors (3 or more) that are present on the same chewy component center. In an additional preferred embodiment, the crunchy component has five flavors that are present on the same chewy component center. See FIGS. 2-5, which depict a "rainbow" (5 flavors/colors) of crunchy component 101 (candy pebble) adhered to a single flavor chewy component 102 (gummy).

In some embodiments, the crunchy component 101 and the chewy component 102 are fruit-flavored. Each different color may have an associated fruit flavor. For example, green candy elements may be lime or sour apple, red elements may be cherry or strawberry, blue elements may be raspberry, orange elements may be orange, purple elements may be grape, yellow elements may be lemon, etc. The multiple flavors allow for mixing and matching the crunchy coating and chewy center to achieve a large number of different permutations of flavor combinations. Also, many different fruit-flavored elements can be used simultaneously, producing a confectionery that is not only dual-textured, but also has multiple flavors incorporated therein.

To manufacture the dual-textured confectionery, the crunchy component 101 must be adhered to the chewy component 102. To do this, the chewy component 102 is created using standard techniques of making gummy candy. Then the candy pebbles are adhered to the outside of the gummy center. In some embodiments, the chewy component 102 is steamed to add tackiness to the outside of the gummy and then the crunchy component 101 is added via sanding. In other embodiments, the crunchy component 101 is adhered to the chewy center via panning. In further embodiments, the crunchy component 101 is added by depositing the chewy component 102 onto a bed of the crunchy component 101.

However, unlike traditional sanded gummies, which contain 10% or less of the sanding material, in the present disclosure, the dual-textured confectionery contains much larger ratios of the crunchy component to the chewy component. In one embodiment, the crunchy component comprises at least about 20% by weight of the confectionery; in other embodiments, the crunchy component comprises at least about 25%; at least about 30%; or at least about 35% by weight of the confectionery. In a further embodiment, the crunchy component comprises at least 40% by weight of the confectionery. Ratios of the crunchy component to the chewy component range from about 60:40; to about 50:50; to about 40:60 of crunchy component to chewy component by weight. In one embodiment, the ratio of the crunchy component to the chewy component may be about 45:55 by weight. In some embodiments, the crunchy component comprises from about 40% to about 70% by weight of the confectionery.

The manufacture of the dual-textured confectionery 100 comprises steps where each of the components are separately made. The crunchy component 101 is made in advance and stored until use. Each different color and/or flavor for the crunchy component, e.g. candy pebbles, can be made separately and may be combined before use if desired to provide a variety of colors and/or flavors. In a preferred embodiment, the crunchy component has a variety of flavors (3 or more) that are present on the same chewy component center. In an additional preferred embodiment, the crunchy component has five flavors that are present on the same chewy component center. See FIGS. 2-5, which depict a "rainbow" (5 flavors/colors) of crunchy component 101 (candy pebble) adhered to a single flavor chewy component 102 (gummy).

Figure 7:
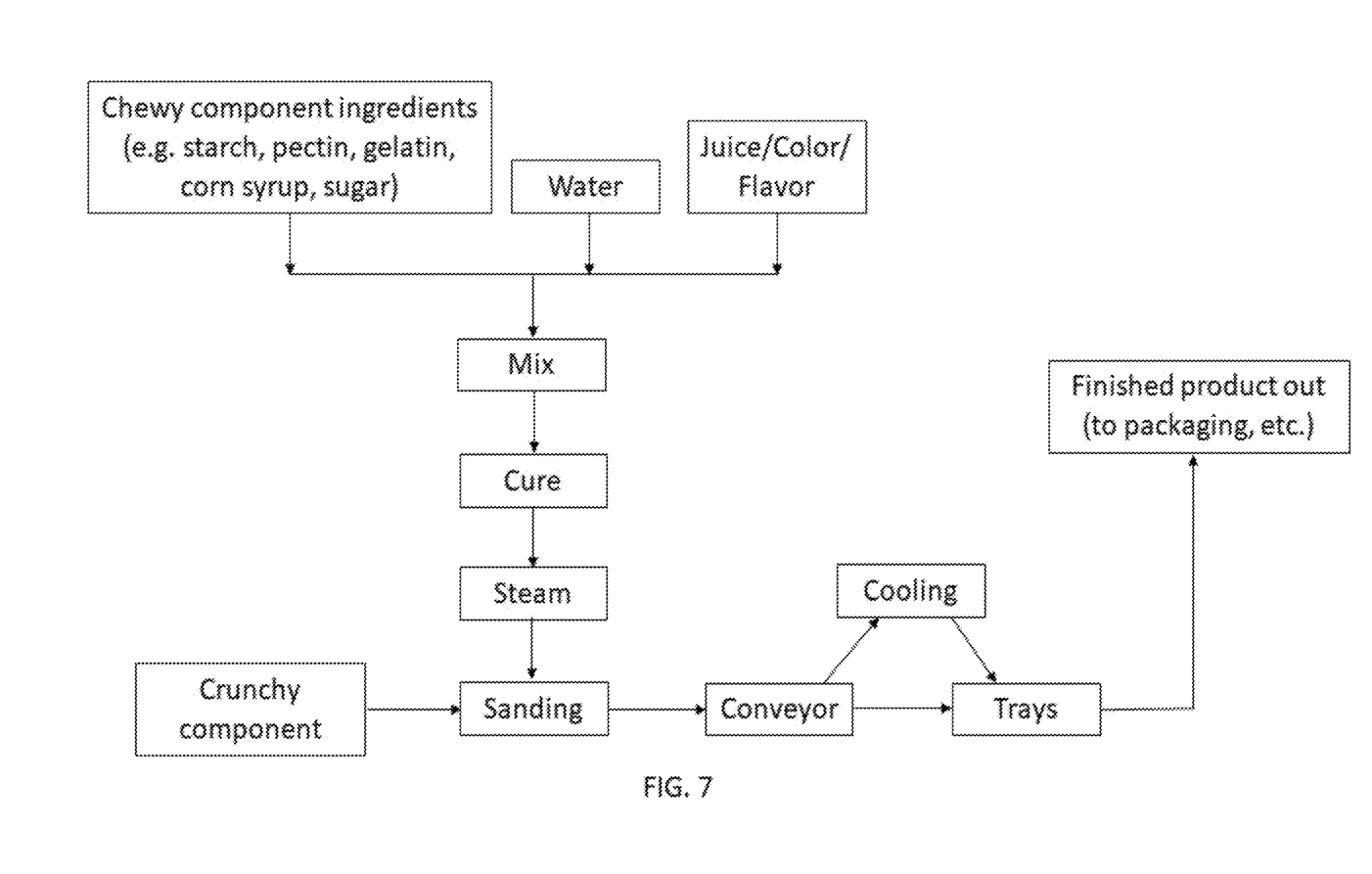
FIG. 7 illustrates a process for the manufacture of the dual-textured confectionery 100, in accordance with an example embodiment of the disclosure.

FIG. 7 illustrates an example manufacturing process for the dual-textured confectionery 100. The chewy component 102 is manufactured and then carried on into a process that adds the crunchy component as a discontinuous coating. Manufacturing the chewy component comprises the steps of combining the chewy component ingredients including, but not limited to one or more of starch, pectin, gelatin, corn syrup, and sugar, with water and juice/color/flavor. The ingredients are mixed and, in the case of a gummy center, may be cured to create the appropriate texture of the chewy center. The chewy center is treated to provide stickiness, such as by steaming. Then a process such as sanding is used to add the crunchy component to the sticky chewy center. The final steps of the process include moving the confectionery through a conveyor with a cooling process and placing the finished product on trays for further processing such as packaging.

Unlike a purely gelatin center, the disclosed dual-textured confectionery 100 has a chewy component 102 that is made from both gelatin and starch to create a component with desired chewiness. In one aspect, the chewy component may be formed through a standard mogul process. This process is not a simple extrusion, but instead involves using trays of starch to make shaped confectioneries. The tray of starch has a mold applied to create cavities which are filled with the confectionery starting material. The confectionery is then allowed to cure while the starch absorbs excess water. Once the chewy component is separated from the starch, it moves on through the process to have the crunchy component added. Furthermore, the mogul process requires curing for 8 or more hours (in some embodiments 12 or more hours; in other embodiments 24 hours, or more) while a simple extrusion of a gelatin-based center can be carried out in a manner of minutes.

During manufacturing, mechanical means such as sanding apparatuses are used to increase the amount of crunchy component 101 that is presented to chewy component 102 so that an appropriate level of crunchy component 101 is present during the process of adhering the two components together. In one embodiment, the crunchy component comprises at least about 20% by weight of the confectionery; in other embodiments, the crunchy component comprises at least about 25%; at least about 30%; or at least about 35% by weight of the confectionery. In a further embodiment, the mechanical means increase the delivery of the crunchy component to maintain a ratio of the crunchy component of at least about 40% by weight of the confectionery. In other embodiments, the mechanical means increase the delivery of the crunchy component so that it maintains a ratio of approximately equal amounts by weight to the chewy component.

Various sizes and shapes of the dual-textured confectionery 100, are contemplated, including round (spherical), oblong or worm-like shapes. In some embodiments, the dual-textured confectionery is round (spherical) or oblong where points on the surface are substantially equidistant from the center, i.e. having an aspect ratio that is generally symmetric and is not string, rope, or worm-like. In some embodiments, the dual-textured confectionery 100, is bite sized, which is no more than about 1 inch in any dimension. In other aspects, the size can be less than 1 inch or greater than 1 inch; in some aspects, the confectionery can be from about 0.25 inch-about 1 inch in any dimension; in other aspects, the confectionery can be from about 1 inch-about 2 inches in any dimension. In further embodiments, more than one layer of crunchy component and chewy component may be used to create a multilayered confection.

While the present invention has been described with reference to certain aspects, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all aspects falling within the scope of the appended claims.

What is claimed is:

1. A dual-textured confectionery consisting of two layers, the first layer comprising a chewy center comprising a gummy candy, and
the second layer comprising a singular layer of crunchy coating comprising irregular pieces of candy, wherein each irregular piece of candy comprises a sugar crystal nucleus and at least a successive layer,
wherein the sugar crystal nucleus has a size of about 0.4 mm to about 0.85 mm, wherein the successive layer surrounds the sugar crystal nucleus, wherein the successive layer comprises sugar and at least one moisture barrier selected from the group consisting of gum arabic, xanthan gum, guar gum, locust bean gum, gum tragacanth, and carrageenan, and each irregular piece of candy has a diameter of between about 1.001 mm to about 3.36 mm;

and said crunchy coating is adhered directly to the outside of the chewy center to form a discontinuous coating.

2. The dual-textured confectionery of claim 1, wherein said crunchy coating comprises at least about 21% by weight of said dual-textured confectionery.

3. The dual-textured confectionery of claim 1, wherein said crunchy coating comprises at least about 30% by weight of said dual-textured confectionery.

4. The dual-textured confectionery of claim 1, wherein said crunchy coating comprises at least about 40% by weight of said dual-textured confectionery.

5. The dual-textured confectionery of claim 1, wherein said crunchy coating comprises from about 40% to about 70% by weight of said dual-textured confectionery.

6. The dual-textured confectionery of claim 1, wherein the ratio by weight of said chewy center and said crunchy coating is about 50:50.

7. The dual-textured confectionery of claim 1, wherein the ratio by weight of said chewy center and said crunchy coating is about 45:55.

8. The dual-textured confectionery of claim 1, wherein the ratio by weight of said chewy center and said crunchy coating is about 55:45.

9. The dual-textured confectionery of claim 1, wherein said crunchy coating is applied to the chewy center via a single application.

10. The dual-textured confectionery of claim 1, wherein the successive layer further comprises flavoring and coloring.

11. A method of manufacturing a dual-textured confectionery consisting of two layers, comprising:

providing a first layer comprising a chewy gummy candy center;

providing a second layer comprising a single layer of crunchy coating comprising irregular pieces of candy, wherein each irregular piece of candy comprises a sugar crystal nucleus and at least a successive layer, wherein the sugar crystal nucleus has a size of about 0.4 mm to about 0.85 mm, wherein the successive layer surrounds the sugar crystal nucleus, wherein the successive layer comprises sugar and at least one moisture barrier selected from the group consisting of gum arabic, xanthan gum, guar gum, locust bean gum, gum tragacanth, and carrageenan, and each irregular piece of candy has a diameter of between about 1.001 mm to about 3.36 mm;

treating said chewy gummy candy center to add tackiness, and delivering the crunchy coating via mechanical means so that it forms a discontinuous coating adhered directly to the outside of the chewy center.

12. The method of claim 11, wherein said crunchy coating comprises at least about 21% by weight of said dual-textured confectionery.

13. The method of claim 11, wherein said crunchy coating comprises at least about 30% by weight of said dual-textured confectionery.

14. The method of claim 11, wherein said crunchy coating comprises at least about 40% by weight of said dual-textured confectionery.

15. The method of claim 11, wherein said crunchy coating comprises from about 40% to about 70% by weight of said dual-textured confectionery.

16. The method of claim 11, wherein the ratio by weight of the chewy gummy candy center and the crunchy coating in said dual-textured confectionery is about 50:50.

17. The method of claim 11, wherein the ratio by weight of the chewy gummy candy center and the crunchy coating in said dual-textured confectionery is about 45:55.

18. The method of claim 11, wherein the ratio by weight of the chewy gummy candy center and the crunchy coating in said dual-textured confectionery is about 55:45.

\* \* \* \* \*